United States Patent [19]

Bodker, Jr.

[11] Patent Number: 4,475,480

[45] Date of Patent: Oct. 9, 1984

[54] METHOD AND APPARATUS FOR RAISING SOFTSHELL CRAWFISH

[76] Inventor: James E. Bodker, Jr., 364 Peachtree Blvd., Baton Rouge, La.

[21] Appl. No.: 456,395

[22] Filed: Jan. 7, 1983

[51] Int. Cl.³ .............................................. A01K 61/00
[52] U.S. Cl. ...................................................... 119/2
[58] Field of Search ................................. 119/2, 3, 4, 5

[56] References Cited

U.S. PATENT DOCUMENTS

| | | | |
|---|---|---|---|
| D. 86,325 | 2/1932 | McCreary | 119/5 X |
| 3,540,414 | 11/1970 | Maloney | 119/2 |
| 3,601,095 | 8/1971 | Olsson | 119/2 |
| 3,658,034 | 4/1972 | Day et al. | 119/2 |
| 3,797,458 | 3/1974 | Day et al. | 119/2 |
| 3,815,546 | 6/1974 | Plante | 119/2 |
| 3,858,554 | 1/1975 | Beaupoil et al. | 119/2 |
| 3,916,833 | 11/1975 | Serfling | 119/2 |
| 3,929,100 | 12/1975 | Thomas et al. | 119/2 |
| 3,933,124 | 1/1976 | Ledoux et al. | 119/2 |
| 3,985,101 | 10/1976 | Thompson | 119/2 |
| 4,198,124 | 4/1980 | Chapman | 119/2 |
| 4,201,153 | 5/1980 | Nace | 119/3 |
| 4,212,268 | 7/1980 | Chapman | |
| 4,324,200 | 4/1982 | Johnson | 119/2 |

FOREIGN PATENT DOCUMENTS 2033191 5/1980 United Kingdom .................... 119/2

*Primary Examiner*—Hugh R. Chamblee
*Attorney, Agent, or Firm*—Charles C. Garvey, Jr.

[57] ABSTRACT

A tank apparatus referred to hereinafter as an intermolt/premolt growth tank, and a method for the growth and harvesting of crawfish during one intermolt cycle through the time period in which the succeeding molt phase is completed. Individual crawfish are selected and placed in concentrated numbers in one of the intermolt/premolt tanks or in a series of such tanks, each of which is supplied with optimum preset selected water quality. The crawfish are fed and harvested individually after molting has occurred or until the late premolt phase, just prior to molting, is easily identifiable. The intermolt/premolt tank apparatus is designed as part of the method and contains contrasting environmental characteristics for the specific purposes of concentrating, feeding, and segregating molting and late premolt crawfish from the remaining population which contains aggressive feeding crawfish. Working in conjunction with the intermolt/premolt growth tank apparatus and for the efficiency of the production method are stocked-seining ponds and/or holding cages which are stocked regularly with crawfish to supply the intermolt/premolt growth tanks. Open bottom molting tanks to further segregate and concentrate late premolt crawfish just prior to the actual molt would also be used to allow the actual molt to be completed.

12 Claims, 3 Drawing Figures

METHOD AND APPARATUS FOR RAISING SOFTSHELL CRAWFISH

BACKGROUND OF THE INVENTION

1. Field of the Invention

The present invention relates to the farming of aquatic crustaceans of the genus "Procambrus" (e.g., *Procambrus clarkii*), and more particularly relates to a method and apparatus for the growth of premolt crawfish and harvesting of soft shell crawfish during the molt cycle. Even more particularly, the present invention relates to an apparatus and method for the growth of premolt crawfish and harvesting of soft shell crawfish where the crawfish are concentrated and segregated according to the degree of advancement in their molt cycle.

2. General Background

Certain edible freshwater crustacea are known by the genus Procambrus and there are various species.

One particular species known in the southern part of Louisiana is *Procambrus clarkii* which is known more commonly as the red swamp crawfish. In areas where these crustacea are popular as a food item, they are simply known by the name "crawfish" or by the slang term "crawdads." Another species is the white river crawfish.

Crawfish have for some time been prepared as a food item in certain parts of Louisiana, primarily in the southern portion thereof and primarily by the numerous French speaking descendants of Nova Scotia known as the "Acadians" or "Cajuns".

Crawfish are eaten in a variety of forms including the very popular boiled crawfish as well as certain other more complex delicacies including crawfish bisque (stuffed crawfish in a brown "roux" gravy served over rice), crawfish etoufee (crawfish sauteed in seasoned sauce and served over rice), crawfish pie (crawfish and seasoned vegetables prepared in a pastry shell), fried crawfish tails (crawfish fried in seasoned batter), etc. Many of these and other exotic crawfish dishes are sold in the nationally famous seafood and creole restaurants in the City of New Orleans, La.

Recently, a new delicacy has appeared in fine restaurants in the South Louisiana area, that dish known as "soft shelled crawfish." To oversimplify, the dish is prepared from soft shell crawfish which applies to either newly molted crawfish that are soft or those that have molted twelve to twenty-four hours before and have a flexible parchment-like shell.

Soft shell crawfish as a food item is a recent development. Extensive farming techniques are needed to economically produce soft shell crawfish in sufficient numbers to make it readily available to the consumer. A significant potential exists for soft shell crawfish in the seafood industry. Although the molting physiology behavior per se is known to the academic community, a need exists for the production of large 3-5 inch crawfish in sufficient numbers through an efficient and economical method. It is the purpose of this invention to provide a method and apparatus which when used together will make for an efficient and economical method for producing commercial quantities of soft shell crawfish suitable as a food item.

Rapid-molting small crawfish, in the 1 to 3 inch range, have been produced commercially for the fish bait industry. The intermolt period for small crawfish is shorter than that of larger crawfish. These smaller rapid-molting crawfish are much easier to concentrate and require less holding time before molting than do the larger crawfish.

As the period of holding time is extended, feeding and cannibalism becomes a problem resulting in increased production time and labor. Large premolt crawfish still feeding and placed in open bottom tanks cannot be concentrated in adequate numbers to merit a commercial shedding operation. To hold, feed, and individually collect large crawfish in open bottom tanks or cages would entail prohibitive space requirements, energy and expense, including exhorbent labor costs.

Producing large soft shell crawfish in a shedding operation involves handling each individual crawfish three to eight times. Crawfish can be concentrated in higher numbers in tanks if there is a substrate which increases the actual surface and which would also provide protection and isolation for individual crawfish. However, a random placement and quantity of such a substrate sufficient to concentrate large crawfish in a tank apparatus would pose several problems.

First to consider is that too much substrate would restrict the movement of crawfish and would increase cannibalism since those recently molted or those close to molting would be trapped against the substrate and could not easily escape the more aggressive feeding crawfish. Secondly, indiscriminate substrate configuration, quantity and placement would obscure observation nd would make for obstacles when trying to harvest one particular individual crawfish out of a concentrated population. It has been found that substrate is important and that if arranged in a configuration so as to allow a large open area to remain in the tank, crawfish would concentrate in the substrate when isolation was preferred and would move into the open area when feeding and movement was preferred. Since soft shell and late premolt crawfish avoid any substrate which would tend to entrap them, the juxtoposition of a substrate to an open area is beneficial as it would tend to segregate soft shell and late premolters from the more aggressive population. Although the open area provides some means of segregation, the open area is heavily used by aggressive crawfish and is designated best as feeding area rather than a molting area. Additional and localized segregation of soft and late premolt crawfish is desirable and can be achieved by providing a shallow area in the tank which is separate and distinct from an open feeding area and the substrate area. Segregation is further enhanced when the surface of the shallow molting area is provided with a shape or a texture which retards the walking speed of encroaching aggressive crawfish while at the same time allowing the escape technique of backward locomotion by tail action to remain relatively unimpeaded for the soft or late premolt crawfish. The use of light and dark contrast also adds to the other segregating characteristics to make the apparatus more efficient. This is done by either shading the substrate and feeding area, and/or coloring the apparatus so that the shallow area is light and the open feeding area is dark.

The tank apparatus with its characteristic areas is supplied with optimum quality water in either a recirculating or a flow through system. The intermolt/premolt growth tanks are arranged in an assembly like fashion in close proximity with "stocked seining ponds" and/or holding cages. "Stocked seining ponds" are small ponds constructed to be easily seined or trawled (with little or no bottom substrate or excessive loose vegetation) and being easily cooled or heated by flowing water and/or shading and greenhouse effect. These ponds are stocked with selected crawfish graded to be in the intermolt or premolt phase, fed, held and seined when the collective growth of the majority is anticipated to be approaching the late premolt phase. Stocked seining ponds are maintained so that a reproducing population of crawfish is not present. These crawfish are further graded upon seining—soft ones for market, feeding premolters for intermolt/premolt growth tanks, and late premolters for open bottom molt tanks.

Holding cages in an acceptable supply of water and near to the intermolt/premolt growth tanks make for added convenience as a handy supply source for restocking intermolt/premolt tanks and replacing dead or other crawfish being removed from the intermolt/premolt growth tanks in small numbers.

By using the stocked seining ponds the time frame for crawfish in the intermolt/premolt growth tanks is reduced. A more rapid turnover (production of soft shell crawfish) can be achieved as much of the growth required to reach the late premolt phase occurs in the stocked seining ponds, where the crawfish are captured collectively rather than individually, as they are in the intermolt/premolt growth tanks.

The final stage for molting requires no special features in the molt tanks since crawfish in the late premolt phase are committed to molting and will not feed or cannibalize each other. In this stage they can be concentrated without concern for much other than water quality.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PRESENT INVENTION

Figure 1:
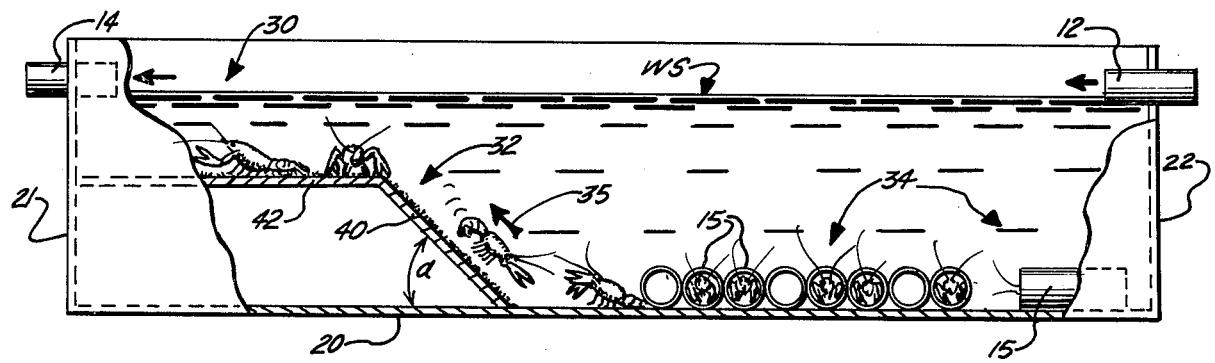
FIG. 1 is a partially broken plan view of the preferred embodiment of the apparatus of the present invention showing the intermolt/premolt growth tank.
Figure 2:
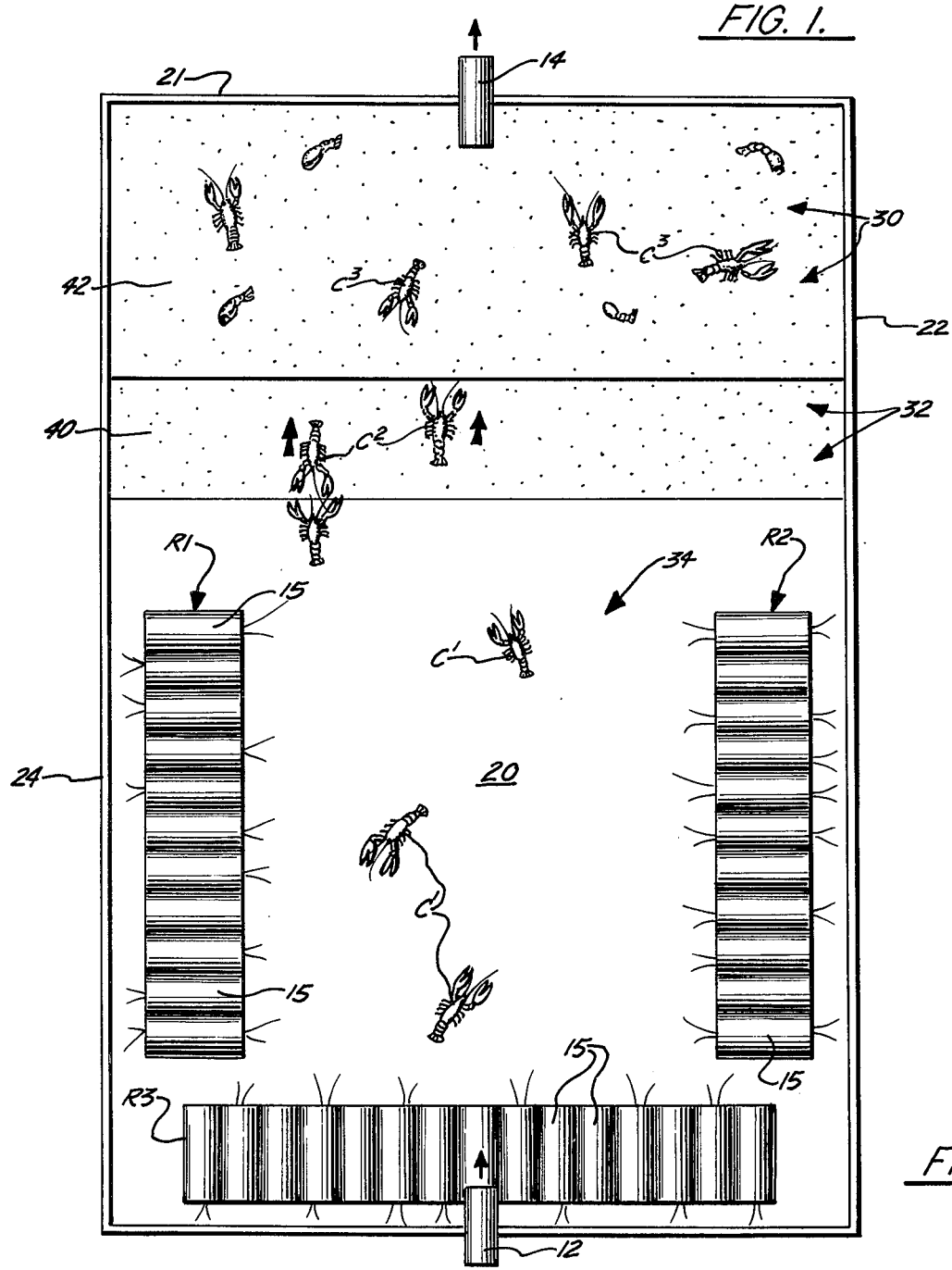
FIG. 2 is a top head view of the preferred embodiment of the apparatus of the present invention illustrating the intermolt/premolt growth tanks.

Shown in FIGS. 1 and 2 are intermolt/premolt growth tanks 10 which are shallow tray-like tanks or cages measuring, for example, four to twenty-four inches (4"-24") deep and preferably wide enough (e.g., 48") for convenient observing and harvesting of individual crawfish (designated as "C3" in the drawings) with a small dip net. Intermolt/premolt growth tanks 10 are equipped with a water supply, having inlet 12 and overflow outlet 14 to allow water to pass through tank 10, and a drain (not shown) to empty and clean the tank.

Tank 10 comprises bottom 20 and sidewalls 21-24. Within the intermolt/premolt growth tanks are individualized compartments 15 of a substrate configuration arranged so as to maintain an open feeding/movement area. These individual compartments can be constructed of, for example, short hollow cylindrical sections of plastic pipe or similar material one to three inches (1"-3") in diameter and joined together in rows R1-R3 as shown in FIG. 2.

Tank 10 provides three elevational sections including shallow area 30, transitional area 32 and deep area 34. Slope 40 and raised floor 42 form these sections. Displaying a contrast in depth from the remainder of the intermolt/premolt growth tank 10, this relatively shallow area 30 becomes the site for crawfish "C2" approaching their molt, to separate themselves from those crawfish "C1" exhibiting cannibalistic tendencies which remain in the deeper protective water containing the compartmentalized substrate. In order to make the shallow area 30 even more suitable as a location for late premolt crawfish to separate themselves, the shallow bottom 30 surface can have or be made of a material with texture and/or a relief which impeds the encroachment of aggressive crawfish moving forward by a walking motion. Sand or gravel could be used to texture bottom 30. At the same time escape locomotion (scooting backwards by a flipping motion of the tail) is not inhibited. This is the one viable protective mechanism available to soft newly molted crawfish. Crawfish, very close to their actual molt, will work their way to the shallow molting area and will stay there until the molt is complete. The difference in elevation, and the textured bottom enhance the separation. The shallow area is attractive to soft shell crawfish because the area is unattractive to the aggressive feeding population. The unattractiveness to the aggressive population can be attributed to the shallower water and lack of substrate both of which make the crawfish more visible. (The arrow 35 in FIG. 1 shows a late premolt crawfish swimming backward up the slope 40 forming transitional section 32.) An aggressive forwardly walking crawfish is marked as 37 in FIG. 1. An additional light-dark color contrast can also aid in the segregation process as late premolters will locate in the lighter area of the shallow area when feeding crawfish seek the protection of the darker area of the remainder of the tank. Thus the bottom of area 20 could be blackened while bottom at area 30 would be of a lighter color.

A supply of water with dissolved oxygen concentrations preferably above 2 ppm and an optimal temperature range between 70 degrees Farenheit and 85 degrees Farenheit are desirable. Water considered "soft" should be used in the later open bottom molt tanks.

As selected crawfish are placed in the intermolt/premolt growth tanks 10 in densities of 2-4 per square foot of tank space, they will seek protection and will begin to concentrate in the protective substrate.

With the necessity of growth occurring in order for crawfish to move through the intermolt stage to the molting stage, feeding must occur in the intermolt/premolt growth tank. A feeding schedule is implemented by placing food in the open area designated by the configuration of substrate—that area bounded by rows R1, R2 and R3. As growth proceeds and crawfish "C2" approach a recognizable late premolt stage they are individually harvested with a dip net and then placed in small open bottom tanks where the molt phase is completed. The crawfish can be harvested individually from the open bottom tank and packed for market soon after their molt.

Figure 3:
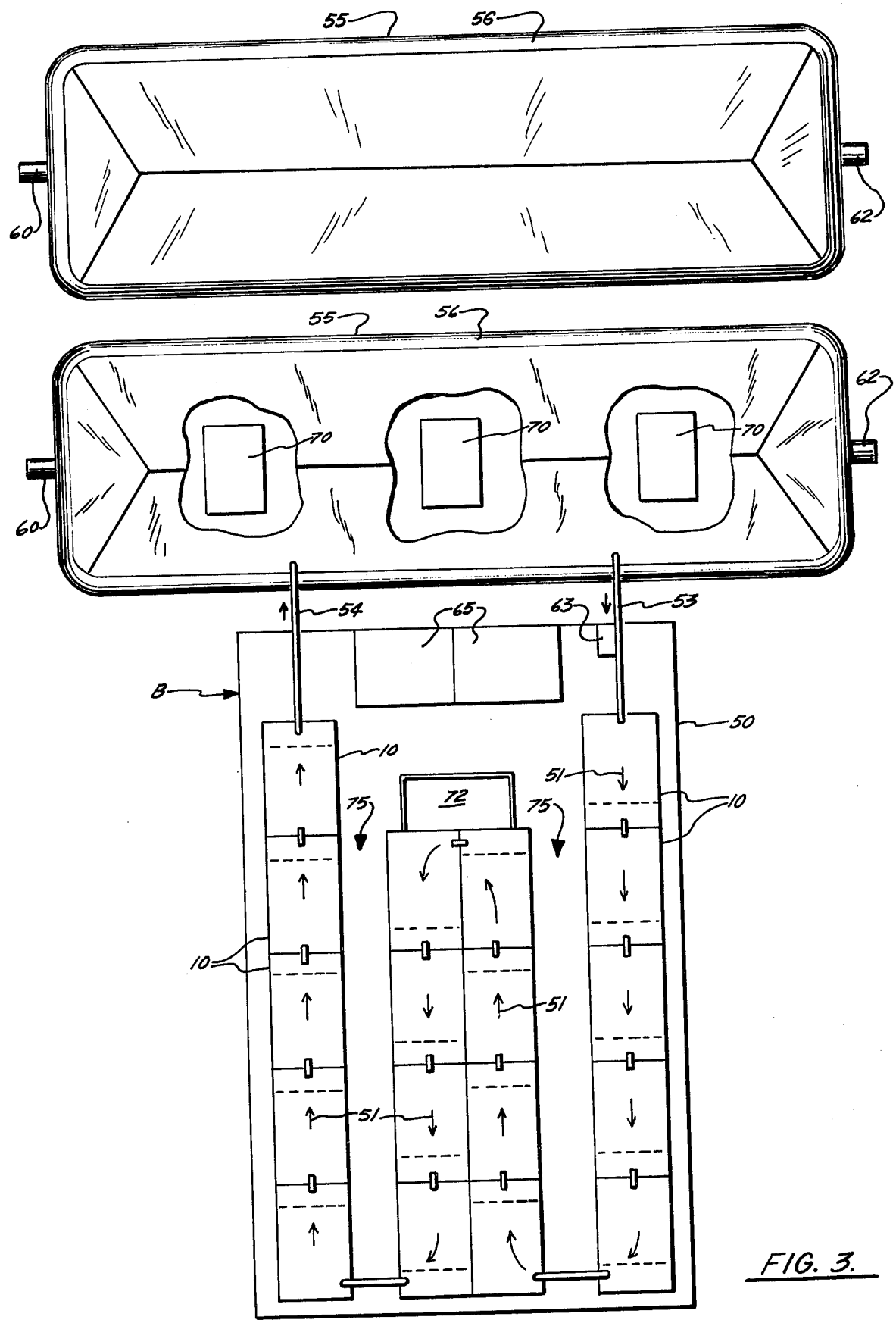
FIG. 3 is a plan view of the preferred embodiment of the apparatus of the present invention showing the system water flow and the seining pond and separation tank portions thereof.

FIG. 3 shows an overall plan view of a typical system utilizing the apparatus of the present invention. In FIG. 3 there can be seen a pair of areas designated generally as 50 and 55. In area 50, a plurality of tanks 10 can be seen connected end to end with the outlet of each tank comprising the inlet of the next sequential tank. Arrows 51 designate the direction of flow. An inlet pipe 53 and an outlet pipe 54 are also seen.

The second area 55 is formed as an earthen pond, for example, surrounded by levee 56 which is continuous and rectangular as shown in the drawings. Drains 60, 62 are provided for affixing the water surface "WS" at a desired level of the entire system. In FIG. 1, water surface "WS" is also shown and can be fixed at any desirable level using hydraulics.

A pump 63 can be used to drive the hydraulic portion of the system. A pair of open-bottom molting tanks 65 are also seen in FIG. 3.

Section 56 would be a stocked pond serving as a water source and also as a means for concentrating crawfish which have been captured from producing ponds so that they can be seined later when desired for placement into the individual tanks 10. In that regard, a plurality of individual holding pens 70 could be placed on the interior of area 56, for example, allowing an intermediate location for the concentration of crawfish which can be used to restock the individual tanks 10.

60 and 62 could be, for example, inlets and outlets. Alternatively, an additional water source could be added by means of a supply pipe (not shown) with 60 and 62 functioning as drains which would be pipes, for example, with their inverts affixed at positions of desired elevation.

Walkways 75 between tanks 10 would allow easy access to each and every tank 10. The entire area 50 could be encased in a building "B," for example, or otherwise surrounded by an enclosure as desired. A solar covering could be provided for winter and shade cloth for summer to assist in the proper adjustment of temperature.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A tank for separating a contained population of premolt/molting and aggressive feeding crawfish comprising:
   a. an aquatic tank having a floor portion and a surrounding peripheral wall, defining an inner liquid holding space;
   b. substrate compartment means positioned on the tank floor and covering a portion thereof for encouraging concentration of aggressive, feeding crawfish in a first area of the tank;
   c. a second area of the tank which is free of said substrate compartments;
   d. separation enhancement means disposed within the confines of said tank for enhancing the separation of premolt/molting crawfish from the aggressive feeding crawfish contained in the tank so that premolt/molting crawfish can escape the first area and enter the second area more easily than aggressive feeding crawfish; and
   e. water supply means for maintaining a volume of water in the tank inner space.

2. The apparatus of claim 1, wherein the separation enhancement means includes in part a premolt/molting area of the tank that is separated from and at a different elevation than the feeding area surface and the substrate compartments.

3. The apparatus of claim 1, wherein the separation enhancement means includes distinct areas of the tank that are spaced apart to permit visual recognition of the crawfish occupying each respective area, and a transitional area of the tank which is more easily traversed by premolt/molting crawfish than by aggressive feeding crawfish.

4. The apparatus of claim 1, wherein the plurality of substrate compartments are concentrated together in a group.

5. The apparatus of claim 1, wherein the enhancement separation means comprises in part a transitional section separating it from the mobile feeding area which transitional section impeds the encroachment of aggressive crawfish moving forward by normal walking motion, yet allows travel thereover by crawfish escape locomotion such as tail flipping.

6. The apparatus of claim 1, wherein the water supply means comprises a flowing stream of water influent to said tank, and discharge overflow means for maintaining a desired water level in the tank.

7. A tank for separating a contained population of premolt/molting and aggressive feeding crawfish, comprising:
   a. an aquatic tank having a generally horizontal floor portion and a surrounding peripheral wall, defining an inner liquid holding space which can be filed with a volume of water to a desired water depth;
   b. a plurality of individual substrate compartments dispensed on the tank floor and covering a portion thereof;
   c. a mobile feeding area surface disposed within the tank, said mobile feeding area surface being free of said substrate compartments;
   d. enhancement separation means disposed within the confines of said tank for enhancing separation of premolt/molting crawfish from the aggressive feeding crawfish in said mobile feeding area surface and comprises in part a premolt/molting surface separate from and at a different elevation the feeding area and a climable surface connecting the premolt/molting surface with the mobile feeding area.

8. The apparatus of claim 6 wherein the climbable surface is an inclined slope.

9. An aquatic environment for separating a contained population of premolt/molting and aggressive feeding crawfish, comprising:
   a. an aquatic tank having an inner liquid holding space that can be filled with a volume of water to a desired water depth;
   b. a multi-section tank floor including;
      a first floor area to be normally occupied by an aggressive, feeding crawfish population;
      a second floor area to be occupied by premolt/molting crawfish;
      transition means communicating with the first and second floor areas for enhancing separation of the premolt/molting crawfish into the second area, away from the aggressive, feeding crawfish in the first area; and
   c. substrate compartment means positioned on the first floor area of the tank floor and covering a portion thereof for encouraging concentration of aggressive, feeding crawfish in the first floor area of the tank.

10. The apparatus of claim 9, wherein the transition means includes means for impeding the encroachment of aggressive crawfish by normal walking motion.

11. The apparatus of claim 9, wherein transition means comprises at least in part a transition section which impeds the encroachment of aggressive crawfish moving forward by normal walking motion, yet allows travel thereover by crawfish escape locomotion such as tail flipping.

12. The apparatus of claim 9 wherein the substrate compartment means area comprises one or more open-ended hides.

* * * * *